United States Patent Office 2,881,637
Patented Apr. 14, 1959

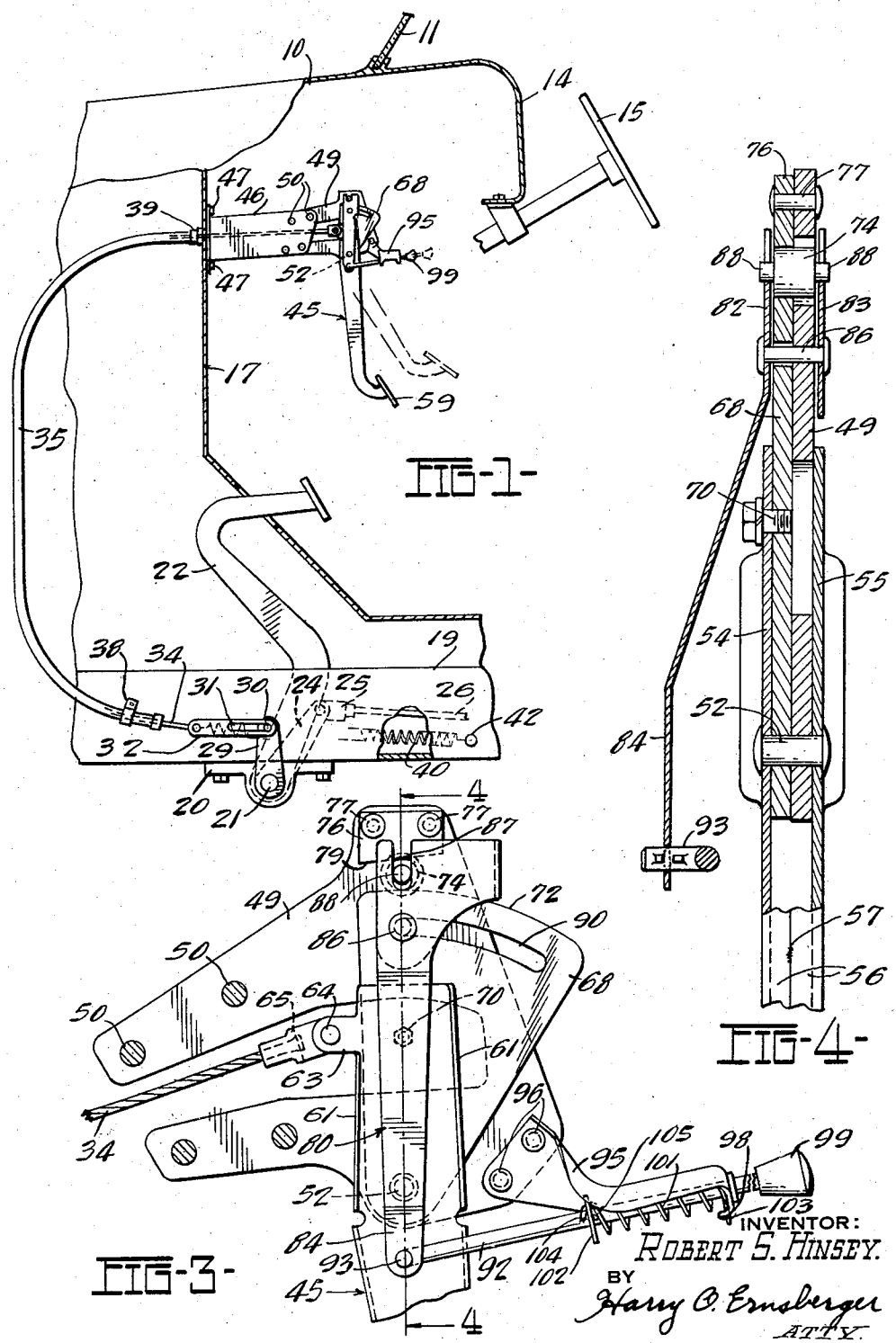

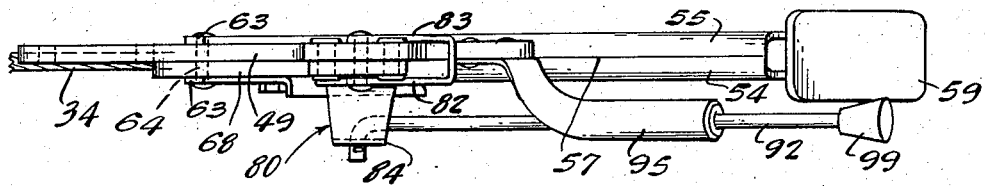
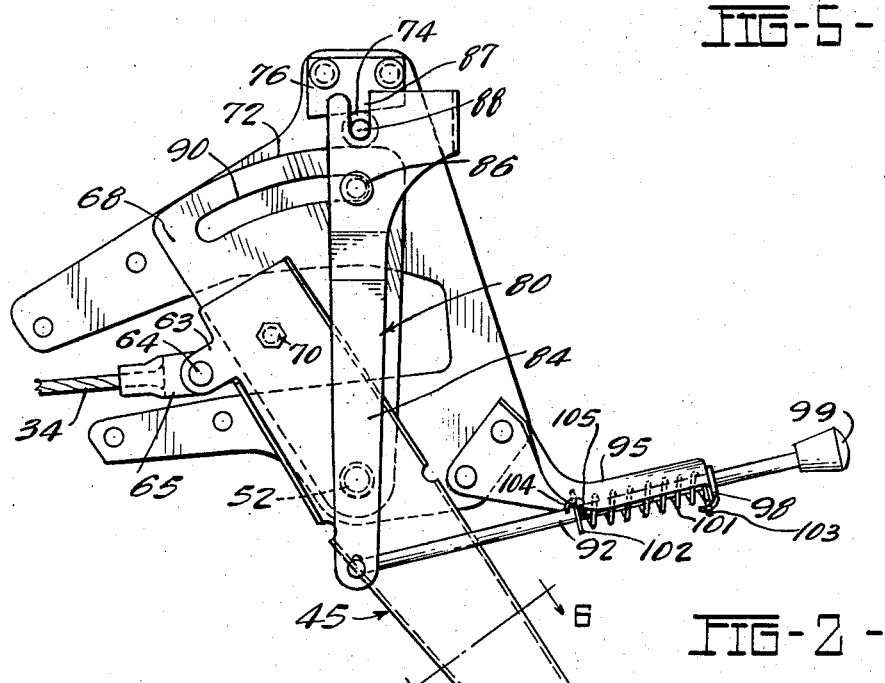
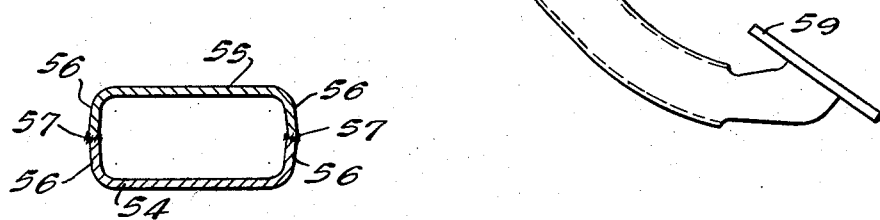

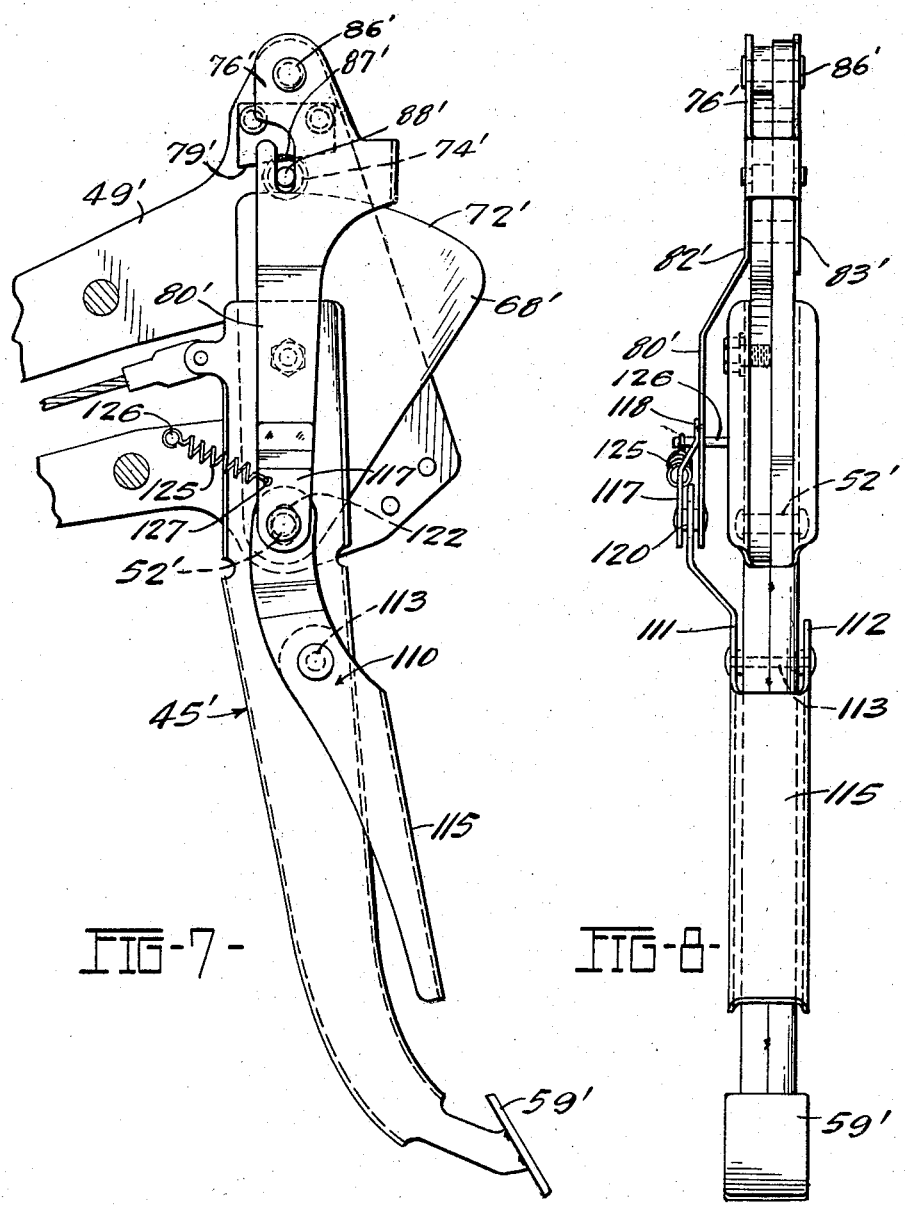

2,881,637

MECHANISM CONTROL

Robert S. Hinsey, Toledo, Ohio, assignor, by mesne assignments, to The Bingham-Herbrand Corporation, a corporation of Ohio Application January 21, 1953, Serial No. 332,184

10 Claims. (Cl. 74—531)

This invention relates to mechanism control devices and, more especially, to devices for actuating and controlling braking mechanism of automotive vehicles.

The invention relates more particularly to lever mechanism of the foot-operated type utilized for setting and releasing the emergency or parking brake mechanism of a vehicle, the lever mechanism embodying a retaining means for holding a lever in any position of adjustment.

An object of the invention is the provision of a foot-operated lever equipped with a clutching surface adapted to be engaged by a friction locking member in a manner whereby the brake mechanism may be effectively set and retained in any position of adjustment.

Another object of the invention relates to the provision of a foot-operated lever mechanism embodying a friction clutch means for holding a lever in adjusted or brake-set position and which may be released by means which may be disposed in any position relative to the fulcrum of the lever.

Another object of the invention embraces the provision of a lever provided with a portion fashioned with an arcuate clutching surface generated about the lever fulcrum, the lever arrangement including a clutch roller adapted to be resiliently urged into locking engagement with the clutching surface for retaining the lever in any position of adjustment.

Another object of the invention resides in the provision of a foot-operated lever arrangement especially adapted to operate the emergency or parking brake mechanism of a vehicle, the lever arrangement embodying a friction clutch cooperating with a clutch surface carried by or associated with the lever to retain the lever in adjusted positions and provided with a clutch-releasing means that may be manually actuated or foot-actuated to release the clutch.

Still another object of the invention embraces the provision of a lever provided with an arcuate clutching surface and a support having an abutment adapted for cooperation with a clutch roller for retaining the lever in adjusted position, the arrangement including means that may be supported independently of the lever for effecting release of the clutch roller from engagement with the arcuate clutching surface and which means may be disposed in any position relative to the fulcrum of the lever.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view partly in section of a portion of an operator's compartment of a vehicle illustrating a form of mechanism control of the invention for controlling braking mechanism of the vehicle;

Figure 2 is a side elevational view illustrating one form of mechanism control of the invention, the control being shown in brake-released position;

Figure 3 is an elevational view of the upper portion of the construction shown in Figure 2 with the lever illustrated in brake-set position;

Figure 4 is an enlarged vertical sectional view taken substantially on the line 4—4 of Figure 3;

Figure 5 is a top plan view of the construction shown in Figure 2;

Figure 6 is a transverse sectional view through the body of the lever taken substantially on the line 6—6 of Figure 2;

Figure 7 is a side elevational view of a lever construction of the invention illustrating a modified form of clutch control or releasing means, and Figure 8 is an end elevational view of the construction shown in Figure 7.

While the forms of the invention of mechanism control are illustrated as utilized for actuating and controlling the emergency or parking brake mechanism of an automotive vehicle, it is to be understood that the invention may be used for actuating or controlling any apparatus where the same may be found to have utility.

Referring to the drawings in detail and first with reference to Figure 1, there are shown portions of a vehicle adjacent the operator's compartment, including a cowl portion 10, a windshield 11, an instrument panel 14, steering wheel 15 and a dashboard or fire wall 17. A portion of the frame of the vehicle is illustrated embodying a member 19 to which is secured a bracket 20, the latter being one of a pair, the other being secured to another frame member (not shown) similar to member 19 disposed at the opposite side of the vehicle.

A shaft 21 is journally supported upon the brackets 20 and a service brake operating means or pedal 22 is secured upon the shaft 21. Fixedly secured upon the shaft 21 is an arm 24 which is connected by means of a clevis 25 to a brake rod 26 which is connected to the brake mechanism (not shown) of the vehicle. Also fixedly secured on the shaft 21 is a second arm 29 provided at its extremity with a pin 30 adapted for traverse in a slot 31 formed in a member or link 32. The link 32 is connected to a flexible cable 34 which is slidably disposed in a sheath or guide 35. One end of the guide or sheath 35 is secured to the frame member 19 by means of a clamp 38 and the other end of the sheath is anchored to the dashboard 17 by a suitable fastening means 39. A contractile spring 40 has one end connected to the member or link 32 and has its other end anchored at at 42 to the frame member 19, the tension of spring 40 acting upon the cable 34, biasing the pedal lever mechanism to brake-released position.

The mechanism control of the present invention is carried by a relatively stationary member or bracket 46 secured to the dashboard 17 by means of rivets 47. A lever-supporting means or member 49 upon which the lever 45 is articulately supported or fulcrumed is secured to the bracket 46 by means of rivets 50. The lever construction 45 is fulcrumed on the support 49 by means of a stub shaft or rivet 52. The lever construction is formed of components or matched sections 54 and 55, preferably formed of sheet metal, the portion below the fulcrum 52 being of box-like configuration, the sections 54 and 55 being provided with inwardly turned flanges 56 which are welded together at the junctures 57 of their meeting edges as shown in Figures 4 and 6.

The extremity of the depending portion of the lever is formed with a pad portion 59 to facilitate foot actuation of the lever. The portions of the sheet metal sections 54 and 55 adjacent and above the fulcrum 52 are formed with outwardly extending flanges 61 to enable the lever sections 54 and 55 to be disposed astraddle of the support 49 which is preferably of uniplanar form. The upper portions of the sheet metal sections 54 and 55 are formed with ear portions or projections 63 provided with openings to receive a stub shaft or rivet 64 for connecting a clevis 65 to the lever, the clevis being fastened to the extremity of the brake-actuating cable 34. Through this arrangement, the cable 34 is connected to the lever 45 whereby clockwise movement of the lever 45 about its fulcrum 52, as viewed in Figures 1 through 3, exerts pull upon the cable 34 to set the brakes of the vehicle.

The lever construction is provided with means for retaining the lever in brake-setting position. Disposed adjacent the inner wall of section 54 of the lever is a sector-shaped member or plate 68, the plate having an opening to accommodate the rivet or stub shaft 52. The member 68 is fixedly secured to the lever construction by means of a bolt 70 extending through an opening in the lever section 54 and threaded into an opening in the plate 68. The plate 68 is formed with an arcuate clutching surface 72, preferably generated about the axis of the fulcrum 52 of the lever, which is adapted to be engaged by a clutch member or roller 74. The clutch means or roller is adapted for engagement with an abutment 76 secured to the support 49 by means of rivets 77, the abutment 76 having a clutch-engaging surface 79 angularly arranged with respect to the general curvature of the clutching surface 72 as shown in Figure 3. It will be obvious from the relation of the clutching surfaces 72 and 79 that the roller or clutch member 74 may be utilized to frictionally lock the plate 68 and the lever construction in adjusted positions. The zones of the plate 68 and abutment 76 adjacent the clutching surfaces may be hardened to minimize wear and thus prolong the life of the surfaces.

The lever arrangement of the invention includes means for controlling the operation of the clutch member or roller 74 for biasing the clutch member toward clutching position and for effecting release of the clutch member. With particular reference to Figures 2 through 5 there is illustrated an arm, member or auxiliary lever 80, preferably formed of sheet metal, having U-shaped configuration at its upper portion forming spaced parallel walls 82 and 83, the wall 82 being projected downwardly as an arm portion 84. The walls 82 and 83 and the support 49 are provided with aligned circular openings to receive a stub shaft or rivet 86 which provides a relatively fixed fulcrum around which the member 80 may be oscillated. The walls 82 and 83 are formed with slots 87 within which are disposed tenons 88 formed axially on the roller or clutch member 74. The edge walls of the slots 87 are dimensioned to accommodate the tenons 88 with a minimum of clearance so that comparatively minor movement of the clutch-releasing member 80 about its fulcrum will effectively release the clutch roller 74. The plate portion 68 of the lever construction is formed with a curved slot 90 through which extends the rivet 86, the slot permitting oscillatory movement of the pedal lever 45 to its various adjusted positions.

A manipulating means for the clutch means is provided in the form of a rod 92 having a laterally extending extremity 93 which projects into an opening formed in the end portion of the arm 84 of the clutch-controlling member 80. A guide means is provided for the rod 92 and includes a member 95 riveted as at 96 to the support 49, the member 95 being formed with an opening through which the rod 92 is slidably disposed. The rod 92 is equipped with a manipulating button or knob 99 for manipulating the clutch control means. A resilient biasing means is provided in the arrangement in the form of a contractile coil spring 101 disposed between the flange 98 and a disk or washer 102 secured to the rod 92 by means of a pin or cotter key 105. One end portion 103 of the spring extends through an opening in the flange 98 and the other end portion 104 extends through an opening in the disk 102. As viewed in Figures 2 and 3, the spring 101 exerts a pull in a righthand direction upon the rod 92, urging the member 80 toward rotation in a counterclockwise direction around its fulcrum 86 carried by the support 49 and biasing or urging the clutch roller 74 into wedging engagement between clutching surfaces 72 and 79 through the engagement of the tenons 88 of the roller with the walls of the slots formed in the spaced walls 82 and 83 of the member 80. Figure 3 illustrates the lever construction when moved to its extreme limit of brake-setting position, while Figure 2 shows the mechanism in full brake-released position. The clutch is adapted to retain the lever 45 in any position of adjustment between the positions illustrated in Figures 2 and 3.

The operation of this form of the invention is as follows: Assuming that the operator desired to effect a setting of the parking brakes, the operator, by placing his foot upon the foot pad 59 of the lever and exerting pressure thereon, causes the lever to be moved from its position shown in Figure 2 to a brake-setting position such, for example, as the lever position shown in Figure 3, although the lever construction may be effective to fully set the brakes at any intermediate position. As the clutch member or roller 87 is under the influence of biasing pressure of the spring 101, the clutch member or roller 74 is wedged or frictionally locked between clutch surfaces 72 and 79 in any position of adjustment of the lever 45. Thus, upon removal of foot pressure from the pad 59 of the lever 45, the clutch member 74 functions to hold or retain the lever in brake-set position. When it is desired to release the brake, the operator grasps the manipulating knob 99 and exerts pressure in a lefthand direction as viewed in Figure 3, swinging the member 80 about the axis of the fulcrum provided by the rivet 86 to effectively move the roller 74 out of clutching engagement with the surfaces 72 and 79. Immediately upon release of the clutch roller, the tension exerted upon cable 34 by the return spring 40 is effective to oscillate the lever 45 in a counterclockwise direction to its initial or brake-release position as illustrated in Figure 2.

Figures 7 and 8 illustrate a modified form of clutch-releasing mechanism. The arrangement shown in Figures 7 and 8 includes a lever 45' formed of sheet metal sections 82' and 83' and is equipped with a sector-shaped member 68' having a clutching surface 72'. The lever 45' is fulcrumed upon a stub shaft 52' passing through an opening in the support 49'. A clutch member or roller 74' is disposed between the clutching surface 72' formed on the lever construction and the clutching surface 79' formed on the abutment 76' secured to the support 49', the clutch being adapted to frictionally hold or lock the lever construction 45' in adjusted position. The clutch-releasing means included the arm 80' having parallel wall portions 82' and 83' provided with slots 87' to accommodate tenons 88' formed axially on the clutch roller 74'. The arm 80' is fulcrumed upon the support 49' by means of a rivet 86' passing through openings in walls 82' and 83' and an opening in the support 49' above the abutment 76'.

The arrangement shown in Figures 7 and 8 embodies a foot-operated means of the general character shown in my copending application Serial Number 532,183 for actuating or controlling the clutch-releasing means. To this end there is provided an arm or auxiliary lever 110 having side walls 111 and 112 provided with openings through which extends a rivet or stub shaft 113 which also projects through openings formed in the walls of the lever 45'. The rivet or stub shaft 113 forms a fulcrum or pivotal support for the arm 110. A bight portion 115 joining the side walls of arm 110 forms a foot pad surface for actuating the arm 110. An articulate connection is provided between arm 80' and the member 110 and is preferably of the pin and slot type to establish an operative connection between adjacent extremities of arm 80' and 110 which are movable in divergent arcuate paths. As illustrated, the arm 80' is provided with a bracket 117 welded to the arm as at 118, the arm and bracket having aligned openings to accommodate a rivet or shaft 120. The upper extremity of side wall 111 is provided with an elongated slot 122 through which extends the rivet 120. Through this form of connection, pressure exerted on the pad 115 in a lefthand direction as viewed in Figure 7 oscillates the arm 110 about its fulcrum 113 to actuate or rotate the arm 80' about its fulcrum or support 86' to disengage the clutch roller 74' from its lever-locking position. A contractile coil spring 125, anchored at one end as at 126 to the support 49' and at its other end to the bracket 117 as at 127, exerts a biasing force through the arm 80' to normally urge the clutch roller 74' into locking engagement with the clutching surfaces 72' and 79'.

In the operation of this form of the invention, the vehicle operator, when desiring to set the brakes, exerts pressure on the pad portion 59' formed on the depending extremity of the lever 45', which pressure swings the lever 45' about its fulcrum 52', and the clutch member or roller 74', under the influence of the biasing force of spring 125, is wedged between the clutching surfaces 72' and 79' and holds the lever 45' in brake-setting position. When it is desired to release the brakes of the vehicle, the operator exerts pressure upon the pad portion 115 of the auxiliary lever or arm 110 to oscillate arm 80' which moves the clutch roller 74' out of clutching or locking relation with the clutching surfaces to permit the lever 45' to return to its initial or brake-release position.

It is apparent that, within the scope of the invention, modifications and different arrangements may be made other than is herein disclosed, and the present disclosure is illustrative merely, the invention comprehending all variations thereof.

What I claim is:

1. Mechanism control including, in combination, a support, a foot-operated lever fulcrumed intermediate its ends upon the support, said lever being provided with a curved clutching surface generated about the fulcrum of the lever, said support being provided with a clutching surface, a clutch member disposed between said clutching surfaces for frictionally retaining the lever in various positions of adjustment, resilient means for biasing the clutch member into engagement with the clutching surfaces, and means engageable with said clutch member for effecting release of the clutch member from the clutching surfaces.

2. Mechanism control including, in combination, a support, a foot-operated lever pivotally mounted intermediate its ends on the support and having a foot pad portion at one end of the lever, said lever being provided with a curved clutching surface generated as a radius about the fulcrum of the lever, an abutment on said support, a clutch member disposed between said abutment and clutching surface on the lever adapted to frictionally engage the abutment and clutching surface for retaining the lever in various positions of adjustment, an arm carried by the support and adapted for operative engagement with the clutch member, means for biasing the clutch member into frictional engagement with the abutment and clutching surface, and means connected with said arm for effecting release of the clutch member from the clutching surface and abutment.

3. Mechanism control including, in combination, a support, a foot-operated lever fulcrumed intermediate its ends upon the support and having a foot pad at one end thereof, said lever being provided with a curved clutching surface generated about the fulcrum of the lever, a clutching surface on the support, a clutch roller disposed between the clutching surfaces for locking said lever in various positions of adjustment, an arm mounted for pivotal movement relative to the support and having operative connection with the clutch roller for controlling the relative position thereof, resilient means for biasing the clutch roller into locking relation with the clutching surfaces, and means connected with said arm at a zone spaced from the fulcrum of the lever for moving the arm to effect release of the clutch roller from locking engagement with the clutching surfaces.

4. Mechanism control including, in combination, a support, a foot-operated lever formed of sheet metal having portions straddling said support, said lever being fulcrumed on the support and provided with a curved clutching surface, said support being provided with an abutment having a clutching surface, a clutch roller associated with said lever and arranged for locking engagement with said clutching surfaces to hold said lever in adjusted position, means including an arm pivotally carried by said support having engagement with said clutch roller, spring means for biasing the clutch roller into locking engagement with the clutching surface on said abutment and said curved clutching surface, and means including a manipulating rod connected to said arm for releasing the clutch roller from locking engagement with the clutching surfaces.

5. Mechanism control including, in combination, a support, a foot-operated lever formed of sheet metal having portions straddling said support, said lever being fulcrumed on the support and provided with a curved clutching surface, said support being provided with an abutment having a clutching surface, a clutch roller associated with said lever and arranged for locking contact with said clutching surfaces to hold said lever in adjusted position, means including an arm pivotally carried on the support and having contact with said clutch roller, spring means for biasing the clutch roller into locking engagement with said clutching surfaces, and means including an arm pivotally supported on the lever and having operative connection with the clutch roller for releasing the clutch roller from locking engagement with the clutching surfaces.

6. Mechanism control including, in combination, a support, a main lever formed of sheet metal having portions straddling said support, said lever being fulcrumed on the support and provided with a curved clutching surface, said support being provided with an abutment having a clutching surface, a clutch roller operatively associated with said lever and arranged for wedging contact with said clutching surfaces to hold said lever in adjusted position, means including an arm pivotally mounted on said support adapted for contact with said clutch roller, spring means for biasing the clutch roller into locking engagement with said clutching surfaces, an auxiliary lever fulcrumed on said main lever, and an articulate connection between said arm and auxiliary lever whereby movement of the auxiliary lever in one direction relative to the main lever effects a release of the clutch roller from locking engagement with the clutching surfaces.

7. Mechanism control including, in combination, a support, a foot-operated lever pivotally mounted intermediate its ends on the support and having a foot pad at one end, means carried by the lever formed with an arculately shaped clutching surface generated as a radius about the axis of the pivot mounting of the lever, a relatively stationary abutment, a clutch roller cooperating with said clutching surface and the abutment for holding the lever in adjusted position, resilient means biasing the clutch roller into clutching engagement with the clutching surface, and means including a pivotally mounted member for moving said clutch roller to an ineffective position.

8. Mechanism control including, in combination, a support, a foot-operated lever fulcrumed intermediate its ends on the support and having a foot pad at one end thereof, an arcuately shaped surface provided on the lever and generated as a radius about the fulcrum of the lever, an abutment provided on the support, a clutch roller cooperating with said arcuately shaped surface and said abutment for locking the lever in adjusted position, an arm pivotally connected with the support and arranged to control the clutch roller, resilient means biasing the clutch roller into locking engagement with the arcuately shaped surface and the abutment, and means having operative engagement with said arm for moving said clutch roller out of locking engagement with the arcuately shaped surface and the abutment to effect a release of the lever.

9. Mechanism control including, in combination, a support, a foot-operated lever fulcrumed intermediate its ends on the support, and arcuately shaped clutching surface provided on the lever generated as a radius about the fulcrum of the lever, an abutment surface provided on the lever, a clutch roller cooperating with said clutching surface and said abutment surface for retaining the lever in adjusted position, means connected with the support and arranged to control the clutch roller, resilient means biasing the clutch roller into lever retaining engagement with the clutching and abutment surfaces, and a manipulating member associated with the clutch roller control means for moving said clutch roller to a lever release position.

10. Mechanism control including, in combination, a support, a foot-operated lever formed of sheet metal having portions straddling said support, said lever being fulcrumed intermediate its ends on the support and provided mith a curved clutching surface generated as a radius about the lever fulcrum, an abutment provided on the support, a clutch roller operatively associated with said lever and arranged for engagement with said curved clutching surface and said abutment to retain said lever in adjusted position, clutch roller control means associated with the support and having operative connection with said clutch roller, spring means for normally biasing the clutch roller into lever retaining engagement with said curved clutching surface and said abutment, and means including a manipulating rod connected with said clutch roller control means for releasing the clutch roller from lever retaining engagement with the curved clutching surface and the abutment.

References Cited in the file of this patent

UNITED STATES PATENTS

| | | |
|---|---|---|
| 1,831,335 | White | Nov. 10, 1931 |
| 2,141,266 | Dickerson | Dec. 27, 1938 |
| 2,159,821 | Sandberg et al. | May 23, 1939 |
| 2,160,679 | Sandberg | May 30, 1939 |
| 2,212,375 | McCarthy | Aug. 20 1940 |
| 2,266,058 | McCarthy | Dec. 16, 1941 |
| 2,288,169 | McCarthy | June 30, 1942 |
| 2,299,508 | Skareen | Oct. 20, 1942 |
| 2,326,377 | McBride | Aug. 10, 1943 |
| 2,531,130 | Jandus | Nov. 21, 1950 |
| 2,587,725 | Hinsey | Mar. 4, 1952 |
| 2,664,014 | Feemster | Dec. 29, 1953 |
| 2,694,945 | Jandus | Nov. 23, 1954 |
| 2,722,136 | Krause | Nov. 1, 1955 |